Dec. 2, 1969  S. A. TALBOT ET AL  3,481,324
BALLISTOCARDIOGRAPH APPARATUS
Filed March 13, 1967  4 Sheets-Sheet 1
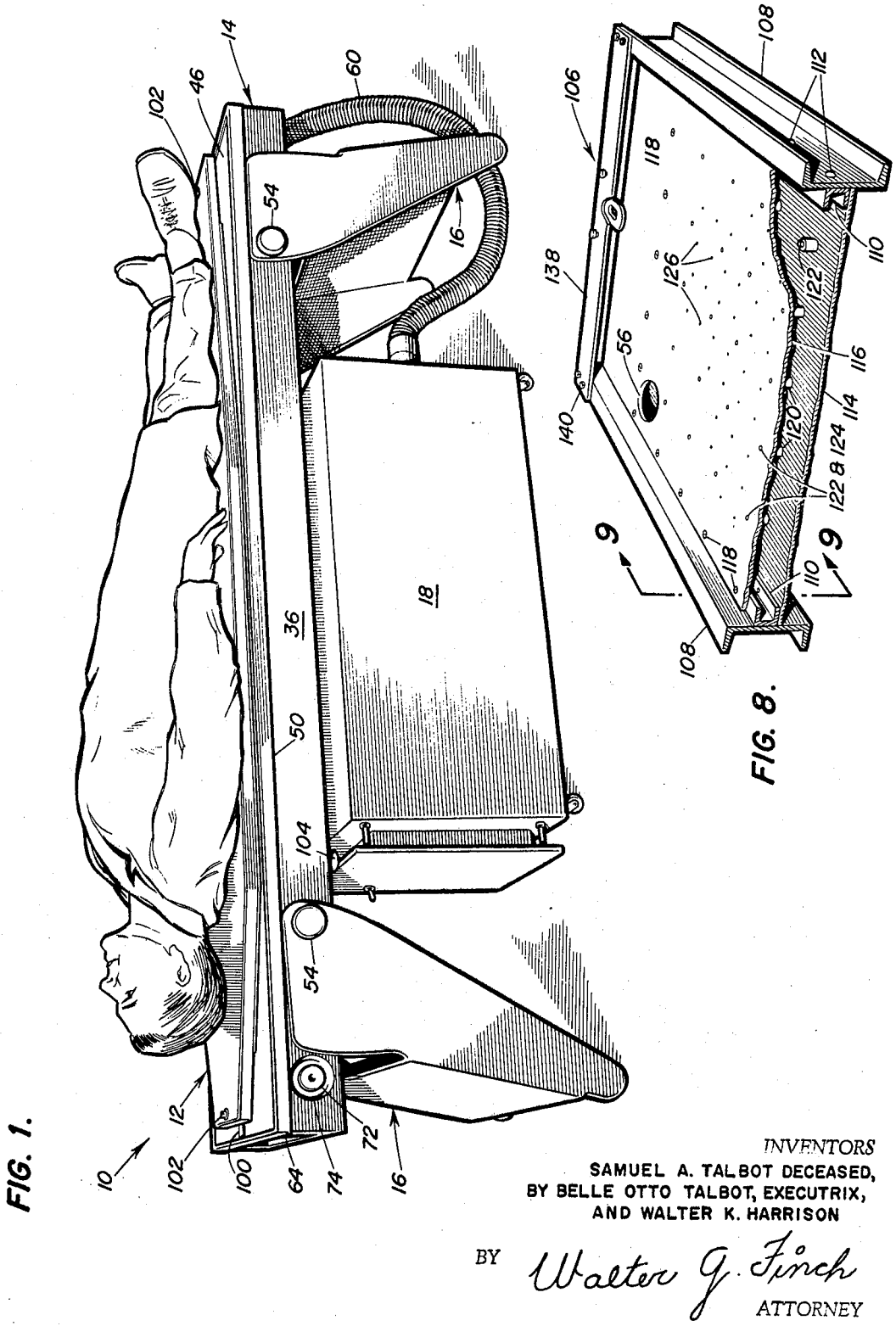
INVENTORS
SAMUEL A. TALBOT DECEASED,
BY BELLE OTTO TALBOT, EXECUTRIX,
AND WALTER K. HARRISON
BY Walter G. Finch
ATTORNEY Dec. 2, 1969    S. A. TALBOT ET AL    3,481,324
BALLISTOCARDIOGRAPH APPARATUS
Filed March 13, 1967    4 Sheets-Sheet 2
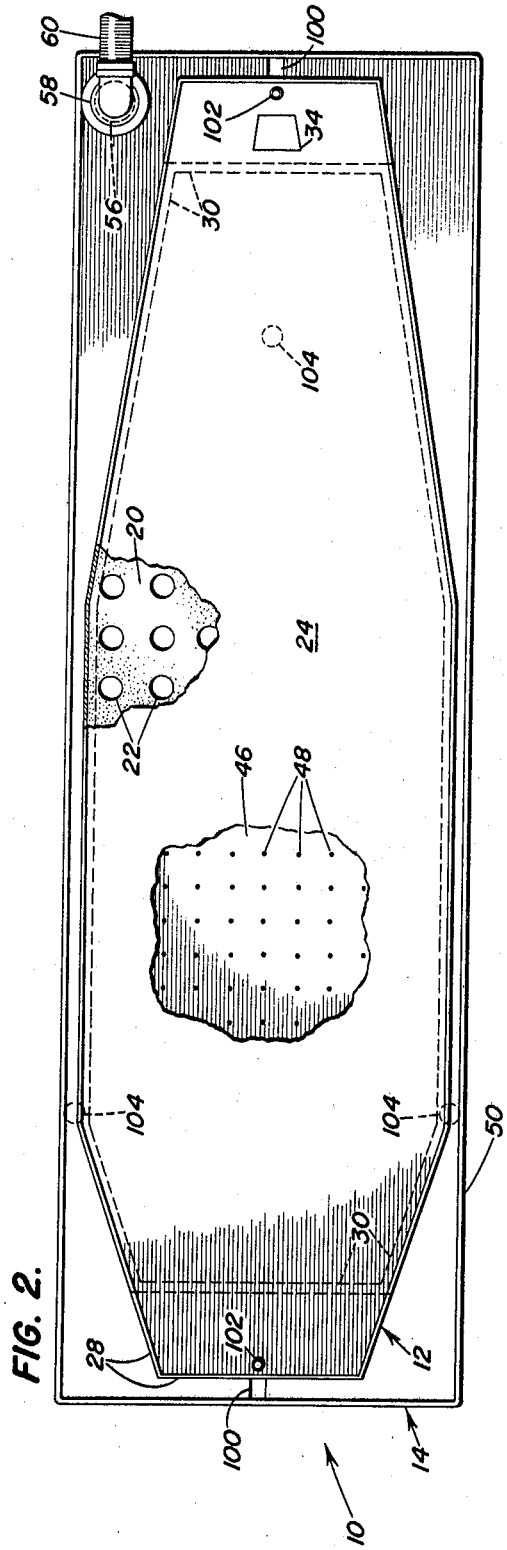
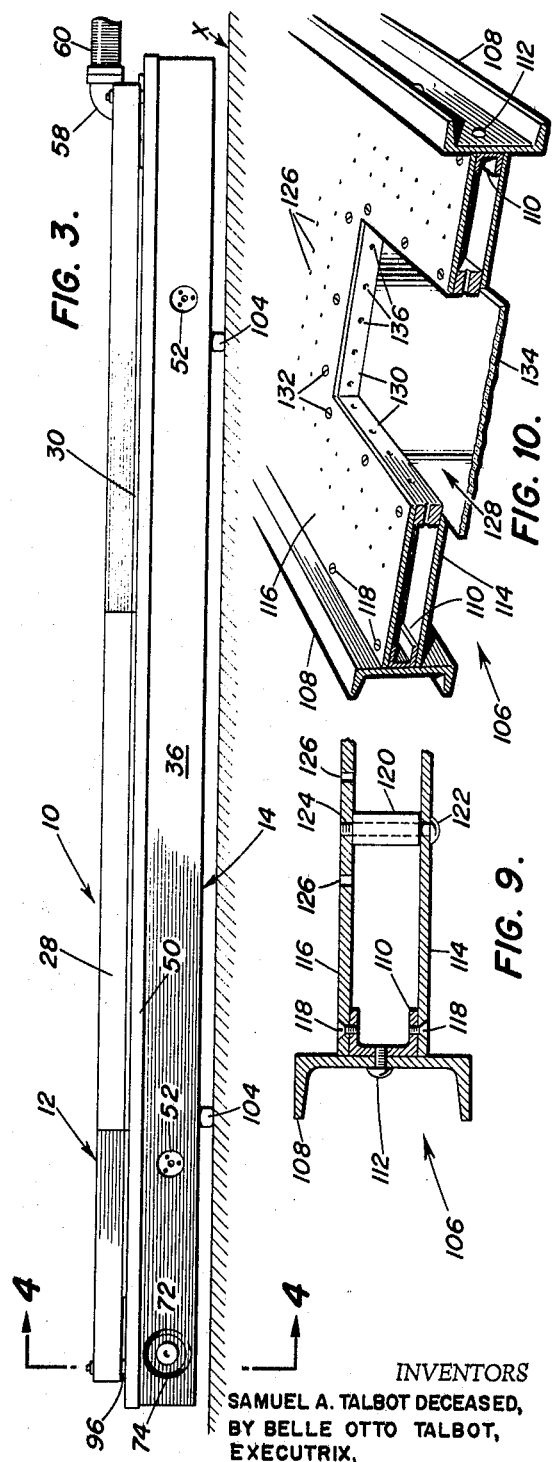
INVENTORS
SAMUEL A. TALBOT DECEASED,
BY BELLE OTTO TALBOT,
EXECUTRIX,
AND WALTER K. HARRISON
BY Walter J. Finch
ATTORNEY Dec. 2, 1969    S. A. TALBOT ET AL    3,481,324
BALLISTOCARDIOGRAPH APPARATUS
Filed March 13, 1967    4 Sheets-Sheet 3
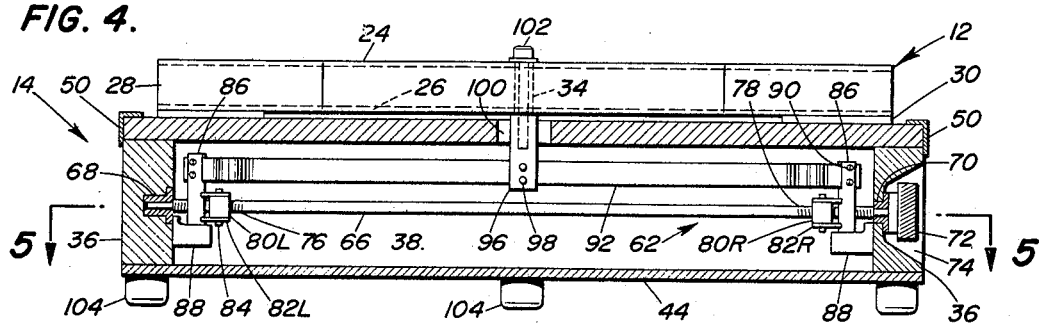
FIG. 4.
FIG. 5.
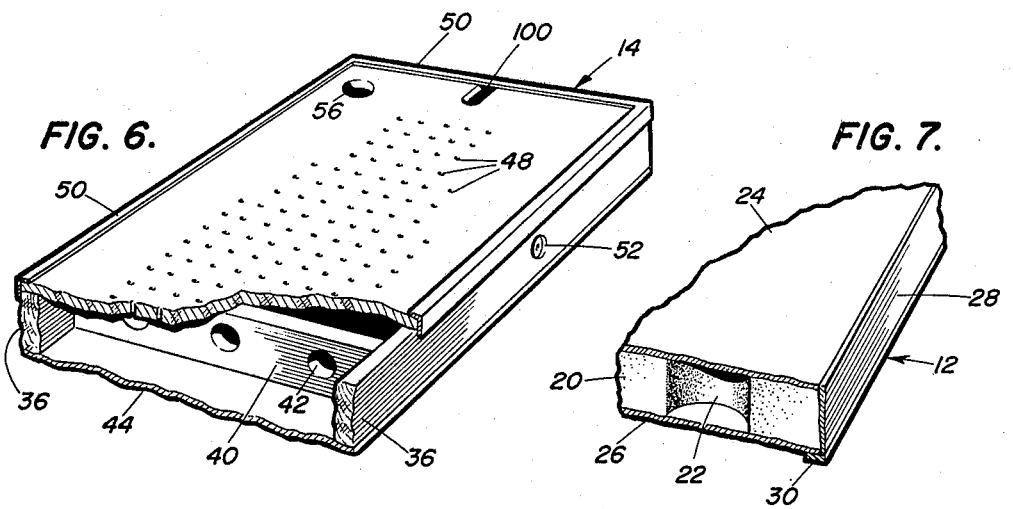
FIG. 6.
FIG. 7.
INVENTORS
SAMUEL A. TALBOT DECEASED,
BY BELLE OTTO TALBOT, EXECUTRIX,
AND WALTER K. HARRISON
BY *Walter G. Finch*
ATTORNEY Dec. 2, 1969 S. A. TALBOT ET AL 3,481,324
BALLISTOCARDIOGRAPH APPARATUS
Filed March 13, 1967 4 Sheets-Sheet 4

INVENTORS
SAMUEL A. TALBOT DECEASED,
BY BELLE OTTO TALBOT,
EXECUTRIX,
AND WALTER K. HARRISON
BY Walter G. Finch
ATTORNEY

United States Patent Office 3,481,324
Patented Dec. 2, 1969

3,481,324
BALLISTOCARDIOGRAPH APPARATUS
Samuel A. Talbot, deceased, late of Towson, Md., by Belle O. Talbot, executrix; and Walter K. Harrison, Baltimore, Md.; said Walter K. Harrison assignor to The John Hopkins University, a corporation of Maryland
Filed Mar. 13, 1967, Ser. No. 622,698
Int. Cl. A61b 5/02; H01j 37/20
U.S. Cl. 128—2.05                                10 Claims

ABSTRACT OF THE DISCLOSURE

This discloses a platform for supporting a body freely isolated from frame structure. Pneumatic cushioning is obtained through the medium of the perforated top of a plenum upon which the lower surface of the platform is juxtaposed in spaced relationship. This relationship is maintained through the provision of peripheral strips on the platform which also retain the air pressure. A turnable bow-spring arrangement is described for limiting the excursion of the platform.

---

This invention relates generally to surgical tables, and more particularly it pertains to apparatus for supporting a living animal, particularly man, so that stroke-volume effects of the heart may be examined and measured.

The heart beat of a subject causes recoil movements in his body as a result of the movement of the blood. With suitable support structure, such movements may be converted from mechanical motions to electrical signals which may be amplified and displayed as waves on an oscillograph.

Amplitudes, slopes, and waveforms of such ballistocardiograms have long been recognized as general indices of hemo-dynamic phenomena. However, precise correlation of these measurements has been hampered because simultaneous observations, as during catheterization, were not practical with existing equipment.

It is an object of the present invention to provide an improved ballistocardiograph apparatus for use on a fluoroscopy table while hemodynamic studies are in progress.

Still another object of this invention is to provide a set of detachable legs for the apparatus which permits the instrument to be employed outside of the catheterization laboratory and used as an ordinary ballistocardiograph.

And still even another object of this invention is to provide an improved float arrangement for supporting a living body for ballistocardiography coordinated with simultaneous X-ray observation.

Another object of this invention is to provide a ballistocardiograph float suspension spring system with calibrating and adjustable positioning means.

To provide a plenum for ballistocardiography which is equally serviceable free-standing or as a table top apparatus is still another object of the invention.

Other objects and attendant advantages of this invention will become more readily apparent and understood from the following detailed specification and accompanying drawings in which:

FIG. 1 is a perspective view of an air bearing ballistocardiograph table in use connected with the necessary air source and incorporating features of this invention;

FIG. 2 is a plan view of the table of FIG. 1 shown partially broken away to reveal the interior of the float and the top of the underlying plenum;

FIG. 3 is a side elevation of FIG. 2;

FIG. 4 is a vertical section taken on 4—4 of FIG. 3;

FIG. 5 is a horizontal section taken on 5—5 of FIG. 4;

FIG. 6 is a fragmentary perspective view of a first embodiment of the plenum;

FIG. 7 is a view similar to FIG. 6 of the platform or float;

FIG. 8 is a fragmentary perspective similar to FIG. 6 but showing details of a second embodiment of a plenum;

FIG. 9 is a vertical sectional taken on line 9—9 of FIG. 8;

FIG. 10 is a perspective sectional view similar to that of FIG. 8 but broken across the window area thereof;

Figure 11:
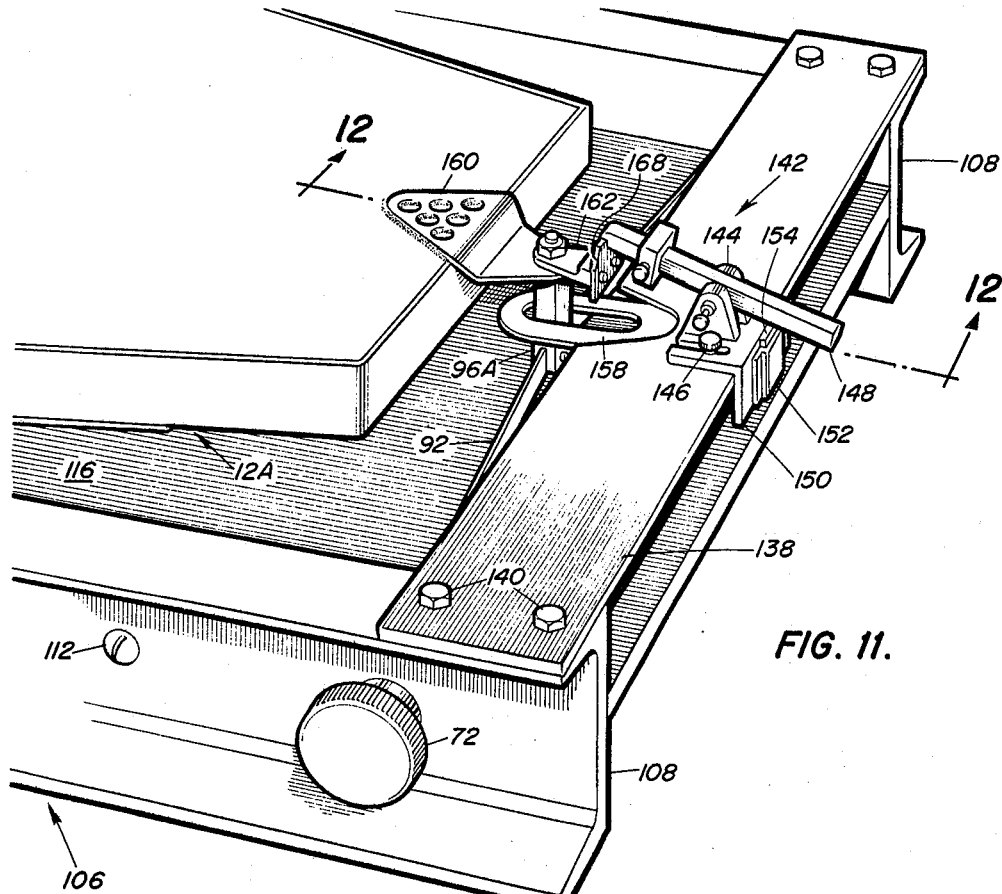
FIGURE 11 is a perspective drawing showing a calibrating device for the ballistocardiograph.
Figure 12:
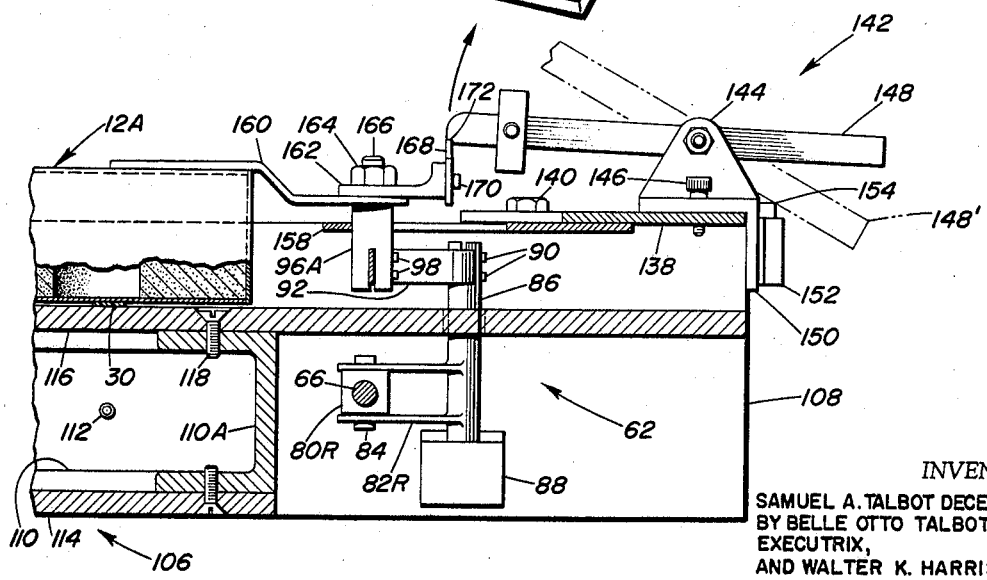
FIG. 12 is a section taken on line 12—12 of FIG. 11.

Referring now to the details of the invention as shown in the drawings, reference numeral 10 indicates generally an air-bearing ballistocardiograph. It will be noted that the patient lies on a floating platform or float 12. This float 12 is positioned on the top of a plenum 14 which forms the top of a table having legs 16.

An air source 18 such as an industrial vacuum cleaner is used to levitate the float 12 with the patient.

The float 12 is a flat-cemented assembly of a plastic foam core 20 and an upper and lower skin 24 and 26 of light metal such as magnesium as best shown in FIG. 7. A plurality of spaced holes 22 are formed in the plastic core 20 to lighten it and a binding strip 28 is adhesively attached all around the peripheral edge. The lower skin 26 is bordered with a thin flat underlying pressure-retaining strip 30 shown in FIGS. 2, 3 and 4.

The plenum 14, of a somewhat larger area than the float 12, consists of a rectangular framework employing a pair of siderails 36 and end cross members 38 with intermediate cross members 40 as shown in FIGS. 4, 5 and 6. The latter members 40 have transverse air passages 42. A floor 44 and a ceiling 46, the latter having a peripheral trim strip 50 of metal angle are secured to this framework preferably by glue so as to make air-tight joints.

The threaded fittings 52 in the siderails 36 for leg attachment should have blind holes for the same reason. Thus, the interior of the plenum 14 can be pressurized with air introduced through an air inlet 56, a swivel 58, and a flexible hose 60 which connects to the air source 18 as shown in FIGS. 1, 2 and 3. A plurality of air passages 48 in a pattern generally defining the float 12 permits air to escape uniformly thereunder from the plenum 12 to raise the float 12 on a film of air. The surplus air escapes under the peripheral strip 30 to the atmosphere.

The float 12 is positioned by a spring arrangement 62 at each end, as best shown in FIGS. 4 and 5. Each spring arrangement 62 can be tensioned bow-like to result in solely a head-to-foot freedom of oscillation of the float 12 with its patient load in the order of one-quarter hertz natural period.

The spring arrangements 62 are mounted in open end chambers 64 in the plenum 14 as shown in FIGS. 4 and 5. A transverse shaft 66 extends from a journal 68 in one side rail 36 to another journal 70 in the opposite side rail 36. One end of shaft 66 projects and is provided with a knob 72 in an exterior cavity 74 so as to be readily accessible for adjustment.

Opposite ends of shaft 66 are threaded with a left hand thread 76 and right hand thread 78, respectively. These threads 76 and 78 carry traveling nuts 80L and 80R which move crank arms 82L and 82R, respectively, through pivots 84 in opposite directions. The crank arms 82L and 82R each journal in blocks 88 attached to the siderails 36 and rotate vertical posts 86.

The posts 86 are slotted vertically and have a clamping screw 90 to receive and hold the opposite ends of a thin elongated spring 92. Undulatory convolutions 94 near each end of the spring 92 permit the opposite rotation of the posts 86 to result in a variable tensioning as shown by the dashed lines.

The center point of each spring 92 is secured to the lower end of a slotted post 96 by a set screw 98. Posts 96 each extend through a slot 100 to emerge above the plenum 14 and there they are attached to opposite ends of float 12 with cap screws 102.

FIGS. 8, 9, 10, 11 and 12 illustrate a modified plenum 106. The side rails 108 are of channel structure. Plenum floor and ceiling supports or longitudinal channels 110 are mounted on the inner faces of the side rails 108 with screws 112. Crosswire channels 110A are mounted from the floor and ceiling 114 and 116 by flat head screws 118 and close both ends of the air chamber as shown best in FIGS. 8 and 12.

To stiffen and keep it flat under load and air pressure conditions, the ceiling 116 is supported by a plurality of spacers 120. These spacers 120 are mounted on screws 122 which pass serially through the floor 114, the spacer 120 and engage in threaded holes 124 formed in the ceiling 116 as shown in FIG. 9. The necessary air passages for levitating the float are designated by reference numeral 126.

As shown in FIG. 3, rubber feet 104 are provided for tripod support when it is desired to use the ballistocardiograph on an X-ray fluoroscopy table X and the legs 16 are detached by removing knobs 54 as shown in FIG. 1.

To avoid interfering X-ray shadows from hardware, such as spacers 120 and screws 122 during catherization, a window 128 is provided in a desired location, say opposite the patient's heart, and extending through the plenum 106. As shown in FIG. 10, this window 128 consists of a framing 130 secured by screws 132 between the floor and ceiling 114, 116 and provided with an X-ray transparent bottom glazing 134 which, however, is impermeable to air. Float-lifting air pressure is developed in this area of window 128 by providing air passages 136 transversely through the framing 130.

For positioning the float 12A of this embodiment of the plenum 106 the spring arrangements 62 are similar to those previously described but with the springs 92 mounted superior to the ceiling member 116. The center point slotted post 96A is thus in the clear and requires an embracing, motion-limiting guard in the form of a slotted tongue 158, as best shown in FIG. 11. This tongue 158 extends from a bridge plate 138 which is secured by bolts 140 across the ends of the siderails 108.

Another tongue 160 is cemented to the float 12A and extends over a threaded stub 166 of the post 96A where it and a bracket 162 are fastened with a nut 164.

The head-to-foot movements of float 12 or 12A occasioned by the body responses to blood coursing in the patient are picked up by an accelerometer (not shown) mounted in a cavity or cut-out 34 depicted in FIG. 2. A calibrating device useful with such accelerometers is indicated by reference numeral 142 and shown in FIGS. 11 and 12. The device 142 consists of a fulcrum 144 adjustably mounted by thumb screws 146 to the center of bridge plate 138. A lever 148 is centrally pivoted in this fulcrum 144 and has an adjustably weighted inner end which is notched at reference notch 172. When notch 172 is engaged with a vertical plate 168, shown secured by screws 170 to the previously mentioned bracket 162, no head-to-foot motion is possible by the float 12A. The lever 148 can be tilted up as shown by the dotted outline 148' and thus frees the float 12A for movement. A magnet 154 mounted in bracket 152 of a depending tail plate 150 of the fulcrum 144 serves to hold the lever 148 so positioned.

Obviously many modifications and variations of the present invention are possible in light of the above teachings. It is, therefore, to be understood that within the scope of the appended claims the invention may be practiced otherwise than as specifically described.

What is claimed is:

1. A ballistocardiograph apparatus, comprising, table structure having a top with a surface, a float positioned upon said table structure and having an area adapted for receiving a living animal, means for spacing said float from the surface of said table structure, said spacing means uniformly supporting the float locally and continuously beneath the entire said receiving area, said float being arranged to have a freedom of movement in a plane parallel to the surface of said table structure, and means coupled to said float for detecting recoil movements of said living animal.

2. A ballistocardiograph apparatus as recited in claim 1, and means for positioning said float upon the surface of said table structure said positioning means comprising a plurality of sinuate flat-spring elements positioned transverse to said float and edge-on thereto, the ends of said springs affixed to the table structure, and the centers of said springs affixed to the ends of said float.

3. A ballistocardiograph apparatus as recited in claim 2, and means for adjusting the tension of said spring elements by bowing the centers thereof, thereby constraining lateral motion of said float.

4. A ballistocardiograph apparatus as recited in claim 3, said means for tensioning said spring elements for positioning said float upon the surface of said table structure including a rotary member affixing the end of each spring to the table structure, and means for rotating the rotary members.

5. A ballistocardiograph apparatus as recited in claim 1, wherein said top of said table structure includes said means for spacing said float from the surface of said table structure, comprising therewith a pressurizable plenum coextensive with said float, with the surface of said top having a plurality of spaced perforations therein for passage of pressurized air therethrough into the spacing between said surface of said top and said float to form an air bearing between said float and the surface of said table structure.

6. A ballistocardiograph apparatus as recited in claim 5, and means for pressurizing said plenum including compressed gas means and a gas inlet in an upper part of said table structure connected with the compressed gas means.

7. A ballistocardiograph apparatus as recited in claim 1, wherein said float comprises a sandwich structure of foam plastic positioned between thin metallic skins.

8. A ballistocardiograph apparatus as recited in claim 1, and additionally X-ray permeable means positioned in said table structure for X-ray observation of said living animal therethrough.

9. A ballistocardiograph apparatus as recited in claim 1, wherein said plenum has an aperture provided therein, and additionally X-ray permeable means positioned in the aperture of said plenum for X-ray observation of said living animal therethrough.

10. A ballistocardiograph apparatus comprising, table structure having a top with a surface, a float positioned upon said table structure for receiving a living animal, means for spacing said float from the surface of said table structure including a pressurizable plenum, with the surface of said top having a plurality of spaced perforations therein for passage of air therethrough into the spacing between said surface of said top and said float to form an air bearing between said float and the surface of said table structure, said plenum having an aperture provided therein X-ray permeable means positioned in the lower portion of the aperture of said plenum for X-ray observation of said living animal therethrough, means arranging said float to have a freedom of movement parallel to the surface of said table, and means connected to said float for detecting recoil movements of said living animal.

References Cited

UNITED STATES PATENTS

| | | | |
|---|---|---|---|
| 2,680,438 | 6/1954 | Edwards | 128—2.06 |
| 3,030,508 | 4/1962 | Mort et al. | 250—57 |
| 3,076,452 | 2/1963 | Rothe | 128—2.05 |

WILLIAM E. KAMM, Primary Examiner

U.S. Cl. X.R.

250—54; 269—328; 308—5